United States Patent
Gomarasca et al.

[15] 3,694,470
[45] Sept. 26, 1972

[54] NOVEL 18-NOR ANDROSTANE DERIVATIVES

[72] Inventors: Piero Gomarasca; Carlo Scolastico, both of Milan, Italy

[73] Assignee: Laboratorio Prodotti Biologici Braglia, Milan, Italy

[22] Filed: March 18, 1970

[21] Appl. No.: 20,830

[30] Foreign Application Priority Data

Oct. 13, 1969 France......................6934926

[52] U.S. Cl............................260/397.45, 260/999
[51] Int. Cl...........................................C07c 169/22
[58] Field of Search ......./Machine Searched Steroids

[56] References Cited

UNITED STATES PATENTS 3,067,193   12/1962   Tishler et al............260/239.5

OTHER PUBLICATIONS

Fieser et al., Topics in Org. Chem. p. 239, Reinhold Pub. Co., N.Y. (1964).
Djerassi, Steroid Reactions p. 232 Holden Day, San Francisco (1963).
Kirk et al., Steroid Reaction Mechanisms p. 270 and 271, Elsevier Pub. Co., N.Y. (1968).

Primary Examiner—Henry A. French
Attorney—Jacobi, Lilling & Siegel

[57] ABSTRACT

This invention relates to novel steroids of the androstane series, hydroxylated in position 11.

These steroids are prepared by reacting an $\alpha$ or $\beta$-11-hydroxy-18-Nor-17$\beta$-methyl-17$\alpha$-alkyl androsta-4,13-diene-3-one with ethyl formiate in solution in a solvent, to form the corresponding hydroxymethylene derivative. This latter compound is then reacted with 2,3-dichloro-5,6-dicyane-p-benzoquinone in solution in dioxane to obtain the corresponding 2-fornyl-$\Delta^{1,4,13}$-11-hydroxy-18-Nor-17$\beta$-methyl-17$\alpha$-alkyl.

The compounds of this invention may be used in particular as medicaments with an anti-androgen action.

3 Claims, No Drawings

NOVEL 18-NOR ANDROSTANE DERIVATIVES

BACKGROUND OF THE INVENTION

Field of the Invention

This invention relates to novel cyclo-pentanephenanthrene compounds of the androstane series and the method of preparing them.

SUMMARY OF THE INVENTION

The invention is more particularly directed to novel 2-formyl-18-Nor-17α-alkyl-17β methyl-androsta-1,4,13-triene-3-ones having an hydroxyl function in position 11, and which may be represented by the general formula:

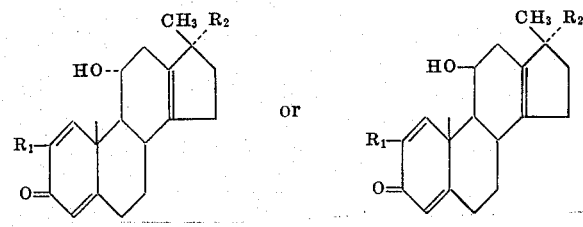

where $R_1$ is a formyl or dihydroxymethyl radical and $R_2$ is a lower alkyl group having one to four carbon atoms or a vinyl or ethynyl group.

Intermediate compounds which are particularly advantageous in the preparation of the derivatives of the invention, are:

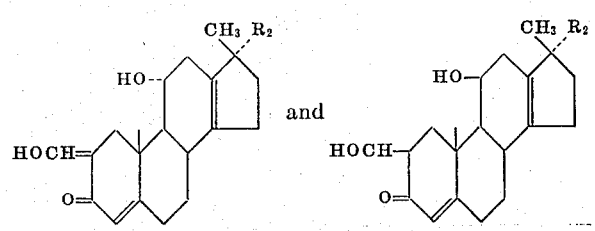

The compounds of this invention possess anti-androgen properties. As evidence of this, there may be mentioned the anti-androgen action of these 18-Nor derivatives of androstane on a castrated rat (the prostate and the seminal vesicles only enlarge a little or not at all when the castrated animal is treated with testosterone or with the compounds of the invention 70–80 percent inhibition of the testosterone) or on a capon (the growth of the crest, stimulated by the administration of testosterone, is completely stopped—100 percent inhibition—by the administration of the compounds of this invention.

As indicated by ultra-violet spectrographic analysis, the compounds of this invention, in aqueous solution, may likewise exist in the hydrated form of the aldehyde group at $C_2 (\lambda_{max} = 245-246 \mu \; E^{1\%}_{1cm} = 340)$. In aqueous solution we therefore have the following equilibrium:

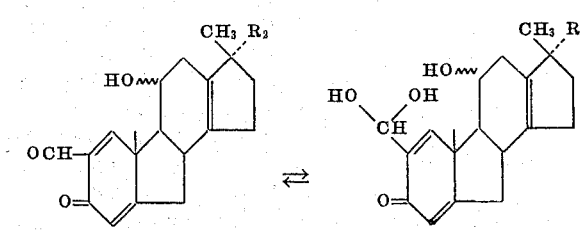

DETAILED DESCRIPTION OF THE INVENTION

The compounds of this invention may be obtained from 11β-hydroxy or 11α-hydroxy-18-Nor-17α-alkyl-17β-methyl androsta-4,13-diene-3-ones, prepared by the retropinacolic elimination of the hydroxyls of the corresponding 17α-alkyl 17β-hydroxy androstanes. The reaction of the 18-Nor derivatives, if they are prepared with ethyl formate in benzene, gives the corresponding 2-hydroxymethylene derivatives.

By reacting these latter compounds with 2,3-dichloro-5,6-dicyanobenzoquinone in dioxane (see U.S. Pat. No. 3,101,353), the 2-formyl-$\Delta^{1,4}$-11-hydroxysteroids of the 11α or 11β series are obtained.

It is also possible to prepare the novel compounds of this invention from 2-formyl-17α-alkyl-androsta-1,4-diene-17β-ol-3-ones hydroxylated in position 11, by treatment with mineral acids in a solvent such as acetic acid, dioxane or tetrahydrofurane, to effect the above-mentioned retropinacolic elimination.

A better understanding of the present invention will be gained from a review of the following examples, which are merely intended to be illustrative and not limitative of the present invention.

EXAMPLE 1

An ethanolic solution (10 ml) of 11β-hydroxy-17α-methyl testosterone (1 g) with concentrated hydrochloric acid added (2.3 ml), is prepared. This is heated to boiling point for 45 minutes. The mixture is then poured into water and extracted with methylene chloride. The organic extracts are washed till neutrality is reached, dried over $Na_2SO_4$ and evaporated to dryness.

The residue from the evaporation is recrystallized from diethyl ether. Six hundred and eighty-one mg of 11β-hydroxy-17,17-dimethyl-18-nor-androsta-4,13-diene-3-one are collected, having a melting point of 179°–180°C [α]$_D$ = +101° (C = 1 percent in dioxane)

U.V. = $\lambda_{max}$ (methanol) 240 mμ ( ε = 15240)

I.R. band at 3390, 1650, 1612 cm$^{-1}$

Analysis:
Found %: C 80.1 H 9.59
Calculated %: C 79,96 H 9.40
for $C_{20}H_{28}O_2$.

The procedure is the same as above for preparing 11β-hydroxy-18-Nor-17α-ethyl-17β-methyl androsta-4,13-diene-3-ones, 11β-hydroxy 18-Nor-17α-vinyl-17β-methyl androsta-4,13-diene-3-ones and 11β-hydroxy-18-Nor-17α-ethynyl-17β-methyl androsta-4,13-diene-3 ones.

EXAMPLE 2

The same procedure is adopted as in Example 1, using as the initial product 11α-hydroxy-17α-methyl testosterone.

There are collected 681 mg of 11α-hydroxy-17,17-dimethyl-18-Nor androsta-4,13-dione-3-one having a melting point of 164°–166°C, [α]$_D$ = +86° (C = 1 percent in dioxane).

U.V = $\lambda_{max}$ (methanol) 240 mμ ( ε = 15780)

I.R.: band at 3410, 1658, 1610 cm$^{-1}$

Analysis:
 Found: C 79,86 H 9,42
 Calculated: C 79,96 H 9,40
 for $C_{20}H_{28}O_2$.

The procedure is the same as before for preparing the 11α-hydroxy-18-Nor-17α-ethyl-17β-methyl androsta-4,13-diene-3-ones, 11α-hydroxy-18-Nor-17α-vinyl-17β-methyl androsta 4,13-diene-3-ones and 11α-hydroxy-18-Nor-17α-ethynyl-17β-methyl androsta-4,13-diene-3-ones.

EXAMPLE 3

It is also possible to prepare the compounds of Examples 1 and 2 by reacting, while stirring, 1 g of suitable steroid with 50 ml of concentrated hydrochloric acid. A clear solution is obtained in about 5 to 30 minutes. This is diluted with distilled water and the product of the reaction is extracted with methylene chloride.

After evaporation of the solvent the residue crystallizes, or rather, in the second case, is purified by chromatography over alumina.

EXAMPLE 4

It is also possible to prepare the compounds of Examples 1 and 2 by treating 1 g of suitable steroid with 2 ml of a solution of acetic acid and concentrated hydrochloric acid (volumetric ratio 1:1).

After a period varying between 30 and 60 minutes, the solution is diluted with distilled water and the product of the reaction is extracted with chloroform or methylene chloride, which is evaporated to dryness under a vacuum. The residue is washed as described above.

EXAMPLE 5

One ml of ethyl formate, 300 mg of NaH and 0.250 ml of anhydrous methanol are added to a benzenic solution (38 ml) of 11β-hydroxy-17,17-dimethyl-Nor-androsta-4,13-diene-3-one (500 mg) while stirring and in a nitrogen atmosphere.

The suspension is left to rest for 2 hours, after which 0.5 ml of methanol and 40 ml of water are added. The organic phase is separated and washed with 2 percent (3 × 5 ml) KOH. The last wash waters are added to the previously separated aqueous phase and the whole acidified with 10 percent hydrochloric acid and adjusted to a pH of 3. The 2-hydroxymethylene derivative obtained is extracted with methylene chloride and the residue of evaporation is used directly to react with the "DDQ" product. With this object, a solution of 320 mg of 2-hydroxymethylene-18-Nor-17,17-dimethyl androsta-4,13-diene-11β-ol-3-one in 7.9 ml of dioxane is treated with 197 mg of "DDQ" in 4.2 ml of dioxane.

The resultant solution is stirred at ambient temperature for 5 minutes, after which the reaction mixture is filtered over a column of 6 g of alumina and washed out with methylene chloride.

The eluate, after evaporation to dryness and recrystallization in ethyl acetate, gives 300 mg of 2-formyl-11β-hydroxy-18-Nor-17,17-dimethyl androsta-1,4,13-triene-3-one, having a melting point of 223°–224°C; [ α ]$_D$ =−14,5 (C = 1 percent in dioxane). U.V. = λ $_{max}$ (methanol) 242 mμ −( ε = 13070 )

I.R. band at 3455, 1704, 1660, 1651, 1622, 1590 cm$^{-1}$

Analysis:
 Found %: C 77,57 H 8.13
 Calculated %: C 77,27 H 8.03
 for $C_{21}H_{26}O_3$.

There are prepared in similar fashion 11β-hydroxy-2-formyl-18-Nor-17α-ethyl-17β-methyl androsta-1,4,13-triene-3-one, 11β-hydroxy-2-formyl-18-Nor-17α-vinyl-17β-methyl androsta-1,4,13-triene-3-one and 11β-hydroxy-2-formyl-18-Nor-17α-ethynyl-17β-methyl androsta-1,4,13-triene-3-one.

EXAMPLE 6

One ml of ethyl formate, 300 mg of NaH and 0.250 ml of anhydrous methanol are added to a benzenic solution (38 ml) of 11α-hydroxy-17,17-dimethyl-Nor androsta-4,13-diene-3-one (500 mg), while stirring and in a nitrogen atmosphere.

After allowing the suspension to rest for 2 hours under these conditions, 0.5 ml of methanol and 40 ml of water are added. The organic phase is separated and washed with 2 percent KOH ( 3 × 5 ml). These last wash waters are added to the previously separated aqueous phase and acidified with 10 percent hydrochloric acid until a pH of 3 is reached. The 2-hydroxy-methylene derivative thus obtained is extracted with methylene chloride and the residue of evaporation is used directly for its reaction with DDQ. For this purpose a solution of 320 mg of 2-hydroxymethylene-18-Nor-17,17-dimethyl androsta-11α-ol-4,13-diene-3-one in 7.9 ml of dioxane is treated with 197 mg of DDQ in 4.2 ml of dioxane.

The resultant solution is stirred at ambient temperature for 5 minutes, after which the reaction mixture is filtered in a column of 6 g of alumina and washed out with methylene chloride.

The washing is evaporated to dryness. Recrystallization from ethyl acetate yields 300 mg of 2-formyl-11α-hydroxy-18-Nor-17,17-dimethyl-1,4,13-triene-3-one having a melting point of 184°–186° ; [ α ]$_D$ =−79.1 (C = 1 percent in dioxane).

U.V. = λ $_{max}$ (methanol) 246 mμ ( ε = 13140)

I.R. band at : 3450, 1728, 1705, 1658, 1653, 1618, 1593 cm$^{-1}$

Analysis:
 Found %: C 77.54 H 8.18
 Calculated: C 77.27 H 8.03
 for $C_{21}H_{26}O_3$.

In a similar fashion there are prepared 11α-hydroxy-2-formyl-18-Nor-17α-ethyl-17β-methyl androsta-1,4,13-triene-3-one, 11α-hydroxy-2-formyl-18-Nor-17α-vinyl-17β-methyl androsta-1,4,13-triene-3-one and 11α-hydroxy-2-formyl-18-Nor-17α-ethynyl-17β-methyl androsta-1,4,13-triene-3-one.

EXAMPLE 7

A solution of 1 g of 2-formyl-17α-methyl-11β, 17β-dihydroxy androsta-1,4-diene-3-one in 50 ml acetic acid and 5 ml concentrated hydrochloric acid is allowed to rest at ambient temperature for 16 hours. The solution is then evaporated under a vacuum to dryness, water added, extraction carried out with chloroform and washing effected till neutrality is reached. The product is dried over $Na_2SO_4$ and evaporated to dryness under a vacuum. Chromatography over silica gel, followed by evaporation to dryness of the eluate and crystallization of the residue from ethyl acetate, gives the final product which has a melting point of 223°–224 °C, $[\alpha]_D = -14°$ (C = 1 percent in dioxane).

EXAMPLE 8

The procedure as described in Example 7 is used, with, as the starting product, 2-formyl-17α-methyl-11α, 17β-dihydroxy androsta-1,4-diene-3-one. The final product is recrystallized from ethyl acetate and ligroine. Melting point = 184°–186°C, $[\alpha]_D = -79°$ (C = 1 percent in dioxane).

The invention is not of course restricted to the examples described and represented; numerous variants are possible which will be conceivable by a person skilled in the art, according to the purposes envisaged, and yet without going outside the scope of the invention.

We claim:

1. Novel 18-Nor androstane derivatives of the formula:

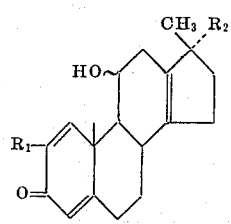

wherein $R_1$ is a member selected from the group consisting of a formyl group and a dihydroxy-methyl group, and $R_2$ is a member selected from the group consisting of an alkyl group having from one to four carbon atoms, a vinyl group, and an ethynyl group.

2. Novel compounds of the formula:

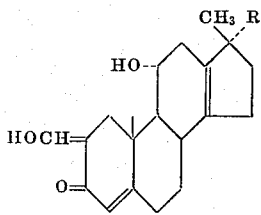

or

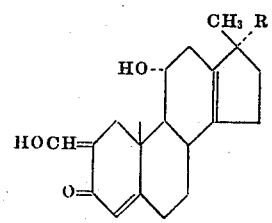

wherein R of each formula represents a member selected from the group consisting of an alkyl group having from one to four carbon atoms, a vinyl group, and an ethynyl group.

3. Novel compounds of the formula:

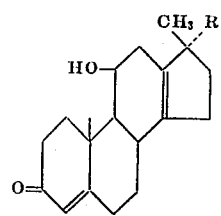

or

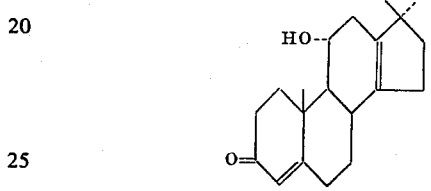

wherein R of each formula represents a member selected from the group consisting of an alkyl group having from one to four carbon atoms, a vinyl group, and an ethynyl group.

* * * * *